(12) United States Patent
Chabas et al.

(10) Patent No.: US 9,951,522 B2
(45) Date of Patent: Apr. 24, 2018

(54) PANEL, ASSEMBLY OF PANELS AND ASSOCIATED ROOFING

(75) Inventors: Eric Chabas, Villeparisis (FR); David Masure, Chatenay Malabry (FR)

(73) Assignee: ARCELORMITTAL INVESTIGACIÒN Y DESARROLLO, S.L., Sestao Bizkaia (ES)

( * ) Notice: Subject to any disclaimer, the term of this patent is extended or adjusted under 35 U.S.C. 154(b) by 0 days.

(21) Appl. No.: 14/127,893

(22) PCT Filed: Jun. 23, 2011

(86) PCT No.: PCT/FR2011/000365
§ 371 (c)(1),
(2), (4) Date: Mar. 13, 2014

(87) PCT Pub. No.: WO2012/175818
PCT Pub. Date: Dec. 27, 2012

(65) Prior Publication Data
US 2014/0283467 A1   Sep. 25, 2014

(51) Int. Cl.
*E04D 3/30* (2006.01)
*H02S 20/25* (2014.01)
(Continued)

(52) U.S. Cl.
CPC ............... *E04D 3/30* (2013.01); *B32B 3/28* (2013.01); *B32B 7/08* (2013.01); *F24J 2/5228* (2013.01);
(Continued)

(58) Field of Classification Search
CPC ... E04D 3/30; E04C 2/32; E04C 2/322; H01L 31/0422; F24J 2/5245; H02S 20/22;
(Continued)

(56) References Cited

U.S. PATENT DOCUMENTS 3,150,465 A * 9/1964 Johnson .................... E04D 3/30
                                                                52/537
3,208,189 A * 9/1965 Hickman .................. E04B 5/40
                                                                52/310
(Continued)

FOREIGN PATENT DOCUMENTS

DE    202008015141 U1   2/2009
EP        0718450 A1    6/1996
(Continued)

*Primary Examiner* — Ryan D Kwiecinski
(74) *Attorney, Agent, or Firm* — Davidson, Davidson & Kappel, LLC

(57) ABSTRACT

The present invention provides a panel having a profile. The panel includes a first longitudinal edge including in succession a first longitudinal rib, a flange, and a second longitudinal rib. Each longitudinal rib includes an upper central part and two lateral wings. The panel also includes a central part and a second longitudinal edge including in succession a first lateral portion, a protruding part, and a second lateral portion. The lateral portions have a configuration permitting them to at least partially overlap the upper central parts of the first and second longitudinal ribs. The protruding part is capable of receiving a fastener. The present invention also provides an assembly of panels marginally overlapping, a roofing and a kit for fabrication of roofing.

23 Claims, 3 Drawing Sheets

(51) Int. Cl.
*F24J 2/52* (2006.01)
*B32B 3/28* (2006.01)
*B32B 7/08* (2006.01)
*H02S 20/00* (2014.01)

(52) U.S. Cl.
CPC ............. *F24J 2/5245* (2013.01); *H02S 20/00* (2013.01); *H02S 20/25* (2014.12); *Y02B 10/12* (2013.01); *Y02B 10/20* (2013.01); *Y02E 10/47* (2013.01); *Y10T 428/12292* (2015.01); *Y10T 428/12361* (2015.01)

(58) Field of Classification Search
CPC .......... H02S 20/23; H02S 20/25; H02S 20/00; Y02B 10/12
See application file for complete search history.

(56) References Cited

U.S. PATENT DOCUMENTS

| | | | | |
|---|---|---|---|---|
| 3,218,773 A | * | 11/1965 | Heirich | E04C 2/322 52/262 |
| 3,667,185 A | * | 6/1972 | Maurer | E04D 3/24 52/478 |
| 5,311,716 A | * | 5/1994 | Houssin | E04D 13/1643 52/410 |
| 5,855,101 A | * | 1/1999 | Schulte | E04D 3/3608 52/506.05 |
| 6,088,983 A | * | 7/2000 | Applebee | E04D 3/363 52/282.1 |
| 6,201,179 B1 | * | 3/2001 | Dalacu | F24J 2/045 136/244 |
| 2003/0029113 A1 | * | 2/2003 | Wetzel, III | E04B 1/34315 52/519 |
| 2004/0177582 A1 | * | 9/2004 | Adriaansen | A01G 9/1438 52/537 |
| 2008/0000184 A1 | * | 1/2008 | Burkart | E04D 3/30 52/518 |
| 2009/0064606 A1 | * | 3/2009 | Ceria | E04D 3/352 52/173.3 |
| 2010/0263661 A1 | | 10/2010 | Faulkner | |
| 2011/0179727 A1 | * | 7/2011 | Liu | F24J 2/5203 52/173.3 |
| 2013/0145606 A1 | * | 6/2013 | Urban | F24J 2/5203 29/525.11 |
| 2013/0160382 A1 | * | 6/2013 | Schick | F24J 2/5228 52/173.3 |

FOREIGN PATENT DOCUMENTS

| | | |
|---|---|---|
| EP | 2103755 A2 | 9/2009 |
| EP | 2186964 B1 | 5/2010 |
| WO | 2010005408 A1 | 1/2010 |

\* cited by examiner

PANEL, ASSEMBLY OF PANELS AND ASSOCIATED ROOFING

This invention relates to a panel, more particularly designed to be assembled to permit construction of roofing for buildings bearing solar modules, but not limited thereto.

BACKGROUND

In the prior art, roof coverings are fabricated with ribbed panels, for example made of pre-painted galvanized steel, where the edges overlap to ensure the roofing leaktightness.

The prior art in addition includes adding solar modules to the covering of buildings, in particular photovoltaic modules, generally consisting of a frame bearing in particular photovoltaic cells.

These solar modules are secured to the roofing by means of a rail fastened on the ribs of the panels, generally by means of U-clamps. This rail has the advantage of separating the solar module from the roofing, facilitating ventilation of the back side of the module. It also allows for securing variable-length solar modules to the roofing.

However, installing such a rail on-site is a real constraint. Handling the rails is not easy, and it takes time to position and fasten the rails. In addition, fabrication of such an assembly should still permit making the covering of the building leaktight, which is not facilitated by on-site assembly conditions.

SUMMARY OF THE INVENTION

An object of the present invention is provide an effective system enabling easier fastening of the solar modules, good leaktightness of the roofing, as well as good ventilation for the back of the module.

An object of the present invention is to provide a panel having a profile including a first longitudinal edge including, in succession, at least one first longitudinal rib, a flange, and a second longitudinal rib, each of the longitudinal ribs comprising an upper central part and two lateral wings, a central part and a second longitudinal edge including, in succession, a first lateral portion, a protruding part, and a second lateral portion, where the lateral portions have a configuration permitting them to at least partially overlap the upper central parts of the longitudinal ribs, where the protruding part is capable of receiving a fastener.

The panel according to the invention can also include the following optional features, alone or in combination:
the panel is made of a shaped metal plate,
the first lateral portion is joined to the central part of the panel by means of a connecting member for which the shape at least partially fits closely the shape of the first longitudinal rib,
the connecting member comprises a plate identical in shape and dimensions to the protruding part,
the first lateral portion, or the aforementioned second lateral portion, is at least partially of the same shape and roughly at the same height as the upper central part of the first longitudinal rib, or the second longitudinal rib, where the spacing between the lateral portions is roughly comparable to the spacing between the upper central parts of the longitudinal ribs,
the central parts of the longitudinal ribs have the same shape and are located at the same height,
the first longitudinal edge includes a succession of three longitudinal ribs separated respectively by a flange, where the spacing between the upper central parts of the longitudinal ribs is constant.

Another object of the present invention is to provide an assembly by marginal overlap of at least two panels according to the invention, for which the first longitudinal edge of a first panel is overlapped at least partially by the second longitudinal edge of the other panel to make a closed space forming a channel in the longitudinal direction of the first panel. The closed space is delimited on the one hand, for the first panel, by the lateral wings of two successive longitudinal ribs and by the flange separating them, and on the other hand, for the other panel, by the protruding part.

The assembly according to the present invention can also include the following optional feature:
the panels are secured by means of fasteners at the overlap of the lateral portions and the upper central parts of the longitudinal ribs.

A further object of the present invention is to provide roofing comprising an assembly according to the invention for which at least one solar module is fastened directly on the protruding parts.

The present invention also provides a kit for fabrication of the roofing according to the invention, including at least two panels according to the invention, fastening means permitting the panels to be fastened to the roofing, at least one solar module and fastening means permitting the solar module to be fastened to the protruding parts of the panels. Optionally, U-clamps making it easier to hold the solar module in place on the protruding parts may be included.

The present invention provides for eliminating use of a fastening rail and modifying the profile of the panel so that marginal overlap of two adjacent panels forms a leaktight chamber to which the solar module can be directly fastened.

BRIEF DESCRIPTION OF THE DRAWINGS

The present invention will be better understood on reading the description below, given as a non-limiting explanatory example, referring to the appended figures in which.

DETAILED DESCRIPTION

The same reference numbers represent the same elements in each of the figures.

Throughout the text, by panel we mean a flat-shaped element, i.e., with thickness that is small compared with its other dimensions. The panel can be in the form of a plate or a sheet and be a single material or a composite assembly. In the latter case, the panel is a superposition of several layers of the same material or different materials. The material in question can be, for example, a metallic, polymer, or ceramic material. Non-limiting examples include steel, aluminum, copper, and zinc metallic materials. The panel is preferably a metal plate. It is preferably steel that has been pre-galvanized and pre-painted to protect against corrosion. The panel can optionally be foamed.

Within the context of the present invention, the panel will have been pre-shaped by means of any known shaping process, among which non-limiting examples include bending, forming, stamping, and molding.

This shaping leads in particular to formation of ribs on the panel surface. Throughout the text, by rib we mean a protrusion formed on the panel surface. The rib can have a trapezoidal shape, as in the case of the exemplary embodiments presented below, or a rectangular, wavy, sinusoidal, or even omega shape, for example. The rib comprises an upper central part and two lateral wings.

Figure 1A:
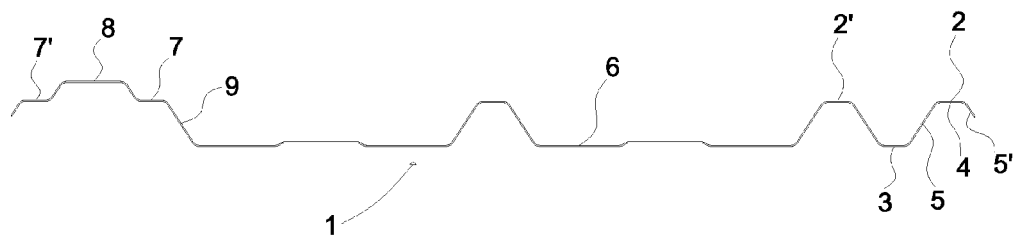
FIG. 1a shows a first example of a panel according to the present invention.
Figure 1B:
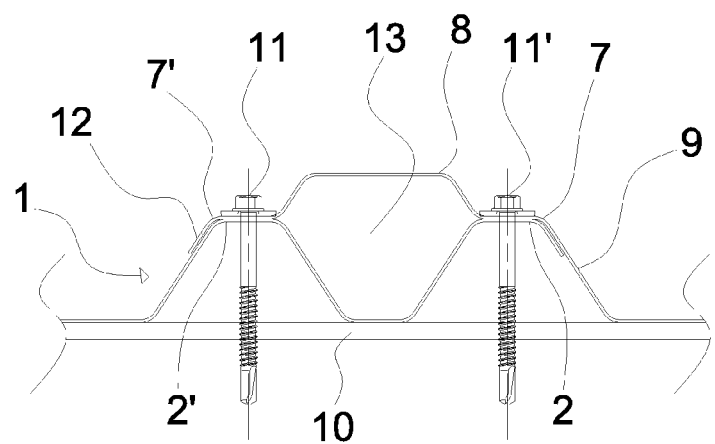
FIG. 1b shows a detail of assembly by marginal overlap of two panels according to the present invention.
Figure 1C:
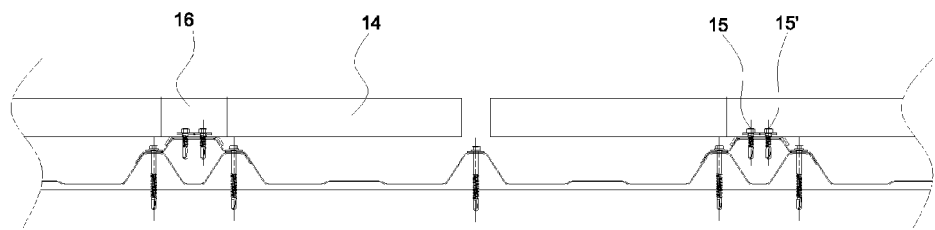
FIG. 1c shows a detail for roofing of a building according to the present invention, bearing solar modules.

We describe an example of a panel according to the present invention, referring to FIGS. 1a, 1b, and 1c.

Panel 1 is shown here in transverse cross sectional view. A first longitudinal edge of panel 1 comprises in succession a first longitudinal rib 2, a flange 3, and a second longitudinal rib 2'. Each of the ribs comprises an upper central part 4 and two lateral wings 5, 5' extending central part 4 on both sides of the latter. In the case of this example, upper central part 4 is flat and lateral wings 5, 5' are sloping, extending downward and outward from upper central part 4.

Within the context of the invention, ribs 2, 2' can of course have other shapes than that described in the case of this example. Rib 2 can also have a shape different from rib 2' and/or can have an upper central part 4 located at a height different from that of rib 2'. In addition, lateral wing 5' of longitudinal rib 2 can be truncated (as in the case of FIG. 1a) or not, depending on the mechanical resistance expected for this part of the panel.

The second longitudinal edge of panel 1 includes in succession a first lateral portion 7, a protruding part 8, and a second lateral part 7', where the first lateral portion 7 is joined to central part 6 of panel 1 by means of connecting member 9.

In the case of this example, protruding part 8 has a shape comparable to longitudinal ribs 2, 2'. However, other shapes are of course possible, among which non-limiting examples include rectangular, curvilinear, and sinusoidal shapes. Protruding part 8 just must be capable of receiving a fastener such as a self-tapping screw, for example.

As illustrated in FIG. 1b, lateral portions 7, 7' have a configuration allowing them to at least partially overlap upper central parts 4 of longitudinal ribs 2, 2' during assembly by marginal overlapping of two panels 1, i.e., when the first longitudinal edge of the first panel is at least partially overlapped by the second longitudinal edge of the other panel. By configuration, here we include the following features: the shape of these lateral portions, the height of the lateral portions compared to central part 6 of the panel, and the spacing of the lateral portions.

In the case of this example, the lateral portions are flat like the upper central parts of the ribs, have a spacing comparable to the spacing between those same upper central parts, and are located in a plane slightly above the plane formed by those same upper central parts in order to allow for overlapping.

However, within the context of the invention, where rib 2 can have a shape different from that of rib 2' and/or can have an upper central part 4 located at a height different from that of rib 2', the same applies to lateral portions 7, 7'. In this embodiment of the panel according to the present invention, in order to allow for assembly of two adjacent panels, the first lateral portion 7, respectively the second lateral portion 7', just must be at least partially of the same shape and roughly at the same height as upper central part 4 of longitudinal rib 2, respectively 2'. The spacing between the two lateral portions 7, 7' also must be roughly comparable to the spacing between upper central parts 4 of longitudinal ribs 2, 2'.

The overlap of upper central parts 4 by lateral portions 7, 7' should be sufficient to allow for securing two panels 1 to each other and/or to building structure 10 by means of fasteners 11, 11', such as self-drilling or self-tapping screws or even pop rivets, for example. Fasteners 11, 11' are indeed located at the level of upper central parts 4 and lateral portions 7, 7' and not in the lower part of the panel, in order to avoid stagnation of water in their vicinity and thus possible failure of the leaktightness of the roofing.

Preferably and always with a view toward leaktightness of the roofing, the second lateral portion 7' includes flashing 12 partially overlapping lateral wing 5 of longitudinal rib 2' of the adjacent panel.

Preferably connecting member 9 closely fits the shape of lateral wing 5' of longitudinal rib 2, in order to facilitate overlap and to stiffen this portion of the panel. However, other shapes for connecting member 9 are possible, depending on the desired aesthetics.

By assembly by marginal overlap of two adjacent panels, the assembly formed on the one hand by the lateral wings of two longitudinal ribs 2, 2' and flange 3 of one panel 1 and on the other hand by protruding part 8 of the adjacent panel delimits a closed space 13, forming a channel in the longitudinal direction of panel 1.

As illustrated in FIG. 1c, solar modules 14 can be fastened directly to protruding part 8, preferably by means of fasteners 15, 15', such as self-drilling screws, without using a rail. Optional U-clamps 16 can facilitate holding modules 14 in place on protruding part 8.

Preferably protruding part 8 will be high enough so that the frame of the solar module, placed on this same protruding part, will not be able to bump up against fasteners 11, 11'. The height of the protruding part will also be adjusted to achieve sufficient stiffness of this portion of the panel, so that the latter resists loading and mechanical stresses generated, for example, by wind or the presence of someone on the roof.

An assembly such as that presented in FIG. 1c helps to ensure leaktightness of the roofing. Indeed, in case of failed leaktightness of fasteners 15, 15', the water flowing over the roof and penetrating to the level of these fasteners will be collected in the closed space or channel 13 and drained outward from the roofing by water flowing in the channel. The roofing thus remains leaktight.

Such an assembly also makes it possible to maintain good ventilation for the back side of the module, where the latter is sufficiently far away from central part 6 of the panel.

Such an assembly also makes it possible to facilitate electrical wiring of solar modules. Indeed, in the case of an assembly according to the prior art, an entire side of the frame of the solar module rests on the rail, which prevents passage of electrical wires at this level unless holes are made in the rail. In the context of the invention, the frame of the solar module does not rest on protruding part 8 except at points. Therefore it is easy to pass electric wires between protruding part 8 and the back side of the solar module.

In the case of this example, panel 1 in addition includes other ribs in central part 6. These ribs have an aesthetic function and/or stiffen the panel.

Figure 2A:
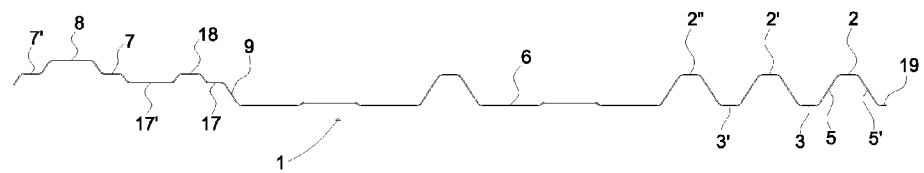
FIG. 2a shows a second example of a panel according to the present invention.
Figure 2B:
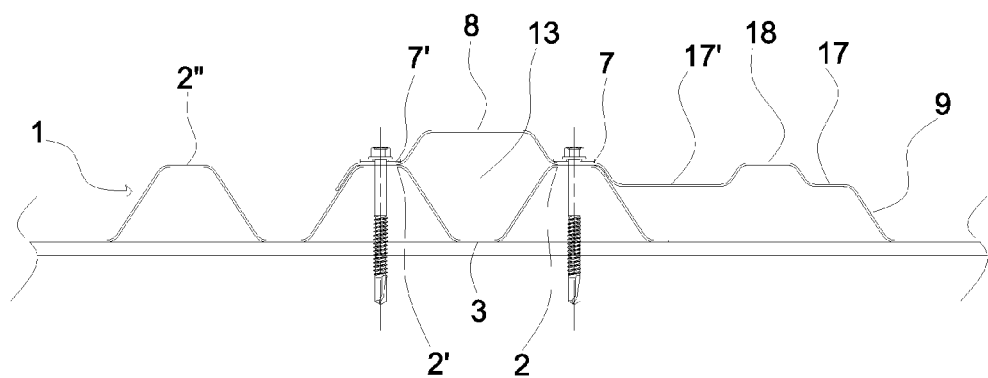
FIG. 2b shows a first embodiment of assembly by marginal overlap of two panels according to the present invention.
Figure 2C:
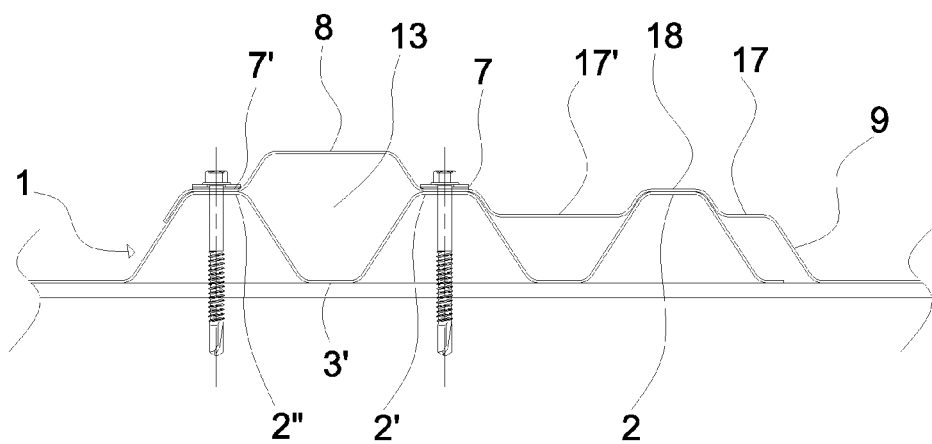
FIG. 2c shows a second embodiment of assembly by marginal overlap of two panels according to the present invention.

We now describe a second example of a panel according to the invention, referring to FIGS. 2a, 2b, and 2c.

Referring to FIG. 2a, a first longitudinal edge comprises a succession of three longitudinal ribs 2, 2', 2" separated by a flange 3, or 3'. Each rib comprises an upper central part 4 and two lateral wings 5, 5' extending central part 4 on both sides of the latter. The second longitudinal edge of panel 1 comprises a protruding part 8 and two lateral portions 7, 7' located on both sides of protruding part 8. In the case of this example, connecting member 9, connecting the first lateral portion 7 to central part 6 of panel 1, was modified to permit assembly by marginal overlap of two panels as illustrated in FIGS. 2b and 2c. It comprises in succession a first plate 17, a rib 18, and a second plate 17'.

As illustrated in FIGS. 2b and 2c, the two lateral portions 7, 7' of a first panel alternately overlap at least partially: either upper central parts 4 of ribs 2 and 2' of the adjacent panel, or upper central parts 4 of ribs 2' and 2" of the adjacent panel. In the latter case, connecting member 9 at least partially fits closely the shape of rib 2 of the adjacent panel which it overlaps.

Channel 13 formed in this way is alternately delimited by: either the assembly formed on the one hand by the lateral wings of two longitudinal ribs 2, 2' and flange 3 of a panel 1 and on the other hand by protruding part 8 of the adjacent panel or the assembly formed on the one hand by the lateral wings of two longitudinal ribs 2', 2" and flange 3' of a panel 1 and on the other hand by protruding part 8 of the adjacent panel.

Such an alternative offers the additional advantage of enabling modification of the spacing between two successive protruding parts 8, or in other words the distances between the 2 fastening points for a solar module resting on the roofing. This feature is important because solar modules are of variable dimensions and the panels generally designed for construction of roofing for buildings bearing solar modules are compatible with only a very limited number of solar modules. With the possibility of modifying the spacing between two successive protruding parts, the panel according to the invention becomes compatible with even more solar modules.

This feature permits limiting the number of different panels in the catalog and makes inventory management easier. The spacing between two protruding parts 8 is adjusted directly at the time of installation, depending on the solar module selected by the customer.

However, in the case of this embodiment of the invention and in order to make possible such alternation in the respective position of two adjacent panels, upper central parts 4 of successive ribs 2, 2', 2" must have identical shape and height as well as constant spacing between them.

Lateral wing 5' of longitudinal rib 2 in this embodiment of the invention preferably includes a supporting foot 19, as illustrated in FIG. 2a. This foot makes it possible to better withstand the load of a solar module fastened to protruding part 8 and to thus avoid possible sagging of this part of panel 1 in case of a heavy load or mechanical stress on the roofing, in particular in case of overlap according to FIG. 2b.

In the case of this example, connecting member 9 comprises in succession a first plate 17, a rib 18, and a second plate 17'. Rib 18 preferably has the same shape as rib 2, except for the two lateral wings which are shorter. The first plate 17 makes it possible to separate connecting member 9 from supporting foot 19 of the panel that it overlaps, and to thus facilitate overlap of two successive panels, in particular in the case of overlap as in FIG. 2c. The second plate 17' preferably has a size and shape such that it can partially overlap the trough of the wave formed by the succession of two longitudinal ribs 2, 2' during assembly of two panels as presented in FIG. 2c. This shape for the connecting member makes it possible to minimize the amount of material used while maintaining good stiffness of the assembly.

Alternatively, the second plate 17' can have shape and dimensions identical to those of protruding part 8. Thus during assembly by marginal overlap of two panels as presented in FIG. 2c, two parallel channels 13 are formed. Therefore solar module 14 can be fastened to either one of the channels, which offers more flexibility in fabrication of the roofing and permits further adjustment of the roofing to the dimensions of the solar modules.

Here we are limited to a succession of 3 longitudinal ribs in order to achieve two possible spacings between two successive protruding parts. Alternatively, we could adjust the number of successive longitudinal ribs in order to adjust the number of possible spacings. The shape of connecting member 9 may be modified accordingly.

What is claimed is:

1. A panel having a profile comprising:
   a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel;
   a central part; and
   a second longitudinal edge comprising in succession a first lateral portion, a protruding part, and a second lateral portion, the protruding part protruding above the first and second lateral portions;
   the first lateral portion or the second lateral portion being at least partially of a same shape and at a corresponding height as the upper central part of one of the at least two longitudinal ribs, the spacing between the lateral portions corresponding to a spacing between the upper central parts of the at least two longitudinal ribs so the first and second lateral portions are configured to at least partially overlap upper central parts of at least two longitudinal ribs of an adjacent panel,
   the protruding part being capable of receiving a fastener.

2. The panel according to claim 1 wherein the upper central parts of the at least two longitudinal ribs are above a plane of the flange.

3. The panel according to claim 1 wherein the at least two longitudinal ribs have a trapezoidal, rectangular, wavy, sinusoidal or omega shape.

4. The panel according to claim 3 wherein the at least two longitudinal ribs have a trapezoidal shape.

5. The panel according to claim 1 wherein the first longitudinal edge includes in succession a further longitudinal rib separated from one of the at least two longitudinal ribs by a further flange.

6. The panel according to claim 1, wherein the first and second lateral portions each receive a fastener.

7. The panel according to claim 6, wherein the protruding part is at a height above a height of the fasteners in the first and second lateral portions.

8. The panel according to claim 1, wherein the protruding part protrudes above a height of the at least two longitudinal ribs.

9. The panel according to claim 1, wherein a spacing between the lateral portions corresponds to a spacing between the upper central parts of the at least two longitudinal ribs.

10. A panel having a profile comprising:
    a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel, the upper central parts of the at least two longitudinal ribs have a same shape and are located at a same height;

a central part; and a second longitudinal edge comprising in succession a first lateral portion, a protruding part, and a second lateral portion, the protruding part protruding above the first and second lateral portions;

the first and second lateral portions being configured to at least partially overlap upper central parts of at least two longitudinal ribs of an adjacent panel;

the protruding part being capable of receiving a fastener;

wherein the first longitudinal edge includes in succession a third longitudinal rib including an upper central part and two lateral wings separated respectively by a further flange, the spacing between upper central parts of the at least two and third longitudinal ribs being constant.

11. An assembly comprising:

at least two panels at least marginally overlapping each other, each panel having a profile comprising:
- a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel;
- a central part; and
- a second longitudinal edge comprising in succession a first lateral portion, a protruding part, and a second lateral portion, the protruding part protruding above the first and second lateral portions;
- the first and second lateral portions being configured to at least partially overlap upper central parts of at least two longitudinal ribs of an adjacent panel,
- the protruding part being capable of receiving a fastener, the first longitudinal edge of a first panel of the at least two panels being at least partially overlapped by a second longitudinal edge of a second panel of the at least two panels to make a closed space forming a channel in a longitudinal direction of the first panel, the closed space being delimited, for the first panel, by lateral wings of two of the at least two successive longitudinal ribs and by the flange separating them, and for the second panel, by the protruding part.

12. The assembly according to claim 11, wherein the first and second panels are secured by fasteners at the overlap of the lateral portions of the second panel and upper central parts of two of the at least two longitudinal ribs of the first panel.

13. The assembly according to claim 12 wherein a height of the protruding part is above a height of the fasteners.

14. The assembly according to claim 11 wherein the second lateral portion of the second panel includes flashing overlapping a lateral wing of the first panel.

15. A roofing comprising:

an assembly according to claim 11; and at least one solar module fastened directly onto the protruding parts of the at least two panels.

16. A kit for fabrication of roofing comprising:

at least two panels according to claim 1;

a fastener enabling fastening of the at least two panels on the roofing; and at least one solar module;

the fastener enabling fastening of the at least one solar module on the protruding parts of the at least two panels.

17. The kit as recited in claim 16 further comprising U-clamps holding the at least one solar module in place on the protruding parts.

18. A panel having a profile comprising:

a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel;

a central part; and a second longitudinal edge comprising in succession a first lateral portion, a protruding part, and a second lateral portion, the protruding part protruding above the first and second lateral portions;

the first and second lateral portions being configured to at least partially overlap upper central parts of at least two longitudinal ribs of an adjacent panel, the protruding part being capable of receiving a fastener, wherein the first and second lateral portions are located above a plane formed by the upper central portions of the at least two longitudinal ribs.

19. The assembly comprising:

at least two panels according to claim 5 at least marginally overlapping each other;

the first longitudinal edge of a first panel of the at least two panels being at least partially overlapped by a second longitudinal edge of a second panel of the at least two panels to make a closed space forming a channel in a longitudinal direction of the first panel, the closed space being delimited, for the first panel, by lateral wings of two of the successive longitudinal ribs and by the flange separating them, and for the second panel, by the protruding part.

20. A panel having a profile comprising:

a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel;

a central part; and a second longitudinal edge comprising in succession a first lateral portion, a protruding part, and a second lateral portion, the protruding part protruding above the first and second lateral portions;

the first and second lateral portions being configured to at least partially overlap upper central parts of at least two longitudinal ribs of an adjacent panel, the protruding part being capable of receiving a fastener, the first and second lateral portions each receiving a fastener.

21. The panel according to claim 20, wherein the protruding part is at a height above a height of the fasteners in the first and second lateral portions.

22. A panel having a profile comprising:

a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel;

a central part; and a second longitudinal edge comprising in succession a first lateral portion, a protruding part, and a second lateral portion, the protruding part protruding above the first and second lateral portions;

the first and second lateral portions being configured to at least partially overlap upper central parts of at least two longitudinal ribs of an adjacent panel, the protruding part being capable of receiving a fastener, the protruding part protruding above a height of the at least two longitudinal ribs.

23. A panel having a profile comprising:

a first longitudinal edge comprising at least two longitudinal ribs in succession with a flange separating successive longitudinal ribs, where each of the at least two longitudinal ribs includes an upper central part and two lateral wings, the at least two longitudinal ribs forming protrusions above a surface of the panel;

a central part; and a second longitudinal edge comprising in succession a first lateral portion, a protruding part, and a second lateral portion, the protruding part protruding above the first and second lateral portions;

the first and second lateral portions being configured to at least partially overlap upper central parts of at least two longitudinal ribs of an adjacent panel, the protruding part being capable of receiving a fastener, a spacing between the lateral portions corresponding to a spacing between the upper central parts of the at least two longitudinal ribs.

* * * * *